(12) United States Patent
Xiao et al.

(10) Patent No.: US 11,430,994 B2
(45) Date of Patent: Aug. 30, 2022

(54) PROTECTIVE COATINGS FOR LITHIUM METAL ELECTRODES

(71) Applicants: GM GLOBAL TECHNOLOGY OPERATIONS LLC, Detroit, MI (US); BROWN UNIVERSITY, Providence, RI (US)

(72) Inventors: Xingcheng Xiao, Troy, MI (US); Binsong Li, Troy, MI (US); Huajian Gao, Providence, RI (US); Kai Guo, Providence, RI (US)

(73) Assignees: GM GLOBAL TECHNOLOGY OPERATIONS LLC, Detroit, MI (US); BROWN UNIVERSITY, Providence, RI (US)

( * ) Notice: Subject to any disclaimer, the term of this patent is extended or adjusted under 35 U.S.C. 154(b) by 92 days.

(21) Appl. No.: 16/234,873

(22) Filed: Dec. 28, 2018

(65) Prior Publication Data

US 2020/0212446 A1 Jul. 2, 2020

(51) Int. Cl.
| | |
|---|---|
| H01M 4/62 | (2006.01) |
| H01M 4/36 | (2006.01) |
| H01M 4/04 | (2006.01) |
| H01M 4/1395 | (2010.01) |
| H01M 4/134 | (2010.01) |
| H01M 4/38 | (2006.01) |
| H01M 4/02 | (2006.01) |
| H01M 10/052 | (2010.01) |

(52) U.S. Cl.
CPC ......... *H01M 4/628* (2013.01); *H01M 4/0402* (2013.01); *H01M 4/134* (2013.01); *H01M 4/1395* (2013.01); *H01M 4/366* (2013.01); *H01M 4/382* (2013.01); *H01M 10/052* (2013.01); *H01M 2004/027* (2013.01)

(58) Field of Classification Search
CPC ...... H01M 4/366; H01M 4/628; H01M 4/134; H01M 2004/027; H01M 4/382
See application file for complete search history.

(56) References Cited

U.S. PATENT DOCUMENTS

| 8,974,946 B2 | 3/2015 | Cai et al. |
| 9,123,939 B2 | 9/2015 | Xiao et al. |
| 9,160,036 B2 | 10/2015 | Yang et al. |

(Continued)

FOREIGN PATENT DOCUMENTS

| CN | 111384399 A | 7/2020 |
| DE | 102019115873 A1 | 7/2020 |
| WO | WO-2017045573 A1 | 3/2017 |

*Primary Examiner* — Maria Laios
(74) *Attorney, Agent, or Firm* — Harness, Dickey & Pierce, P.L.C.

(57) ABSTRACT

Double-layered protective coatings for lithium metal electrodes, as well as methods of formation relating thereto, are provided. The negative electrode assembly includes an electroactive material layer including lithium metal and a protective dual-layered coating. The protective dual-layered coating includes a polymeric layer disposed on a surface of the electroactive material layer and an inorganic layer disposed on an exposed surface of the polymeric layer. The polymeric layer has an elastic modulus of greater than or equal to about 0.01 GPa to less than or equal to about 410 GPa. The inorganic layer has an elastic modulus of greater than or equal to about 10 GPa to less than or equal to about 1000 GPa.

11 Claims, 4 Drawing Sheets

(56) References Cited

U.S. PATENT DOCUMENTS

| | | | |
|---|---|---|---|
| 9,252,411 B2 | 2/2016 | Abd Elhamid et al. | |
| 9,302,914 B2 | 4/2016 | Liu et al. | |
| 9,362,552 B2 | 6/2016 | Sohn et al. | |
| 9,373,829 B2 | 6/2016 | Xiao et al. | |
| 9,437,871 B2 | 9/2016 | Zhou et al. | |
| 9,537,144 B2 | 1/2017 | Huang et al. | |
| 9,647,254 B2 | 5/2017 | Dadheech et al. | |
| 9,896,763 B2 | 2/2018 | Dadheech et al. | |
| 9,905,847 B2 | 2/2018 | Dadheech et al. | |
| 9,923,189 B2 | 3/2018 | Xiao | |
| 9,929,435 B2 | 3/2018 | Cai et al. | |
| 9,979,008 B2 | 5/2018 | Dai et al. | |
| 9,985,284 B2 | 5/2018 | Dadheech et al. | |
| 10,084,204 B2 | 9/2018 | Dai et al. | |
| 10,381,170 B2 | 8/2019 | Dai et al. | |
| 2007/0221265 A1* | 9/2007 | Affinito | H01M 4/628 136/243 |
| 2014/0170465 A1* | 6/2014 | Visco | H01M 2/1686 429/144 |
| 2015/0056387 A1 | 2/2015 | Dadheech et al. | |
| 2015/0056493 A1 | 2/2015 | Dadheech et al. | |
| 2015/0056507 A1 | 2/2015 | Dadheech et al. | |
| 2015/0236324 A1 | 8/2015 | Xiao et al. | |
| 2015/0349307 A1 | 12/2015 | Dadheech et al. | |
| 2016/0111721 A1 | 4/2016 | Xiao et al. | |
| 2016/0172665 A1 | 6/2016 | Zhou et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2016/0218342 A1 | 7/2016 | Xiao et al. | |
| 2017/0162859 A1 | 6/2017 | Yang et al. | |
| 2017/0214079 A1 | 7/2017 | Dai et al. | |
| 2017/0338490 A1 | 11/2017 | Xiao et al. | |
| 2018/0048022 A1 | 2/2018 | Yang et al. | |
| 2018/0287207 A1 | 10/2018 | Dai et al. | |
| 2018/0309165 A1 | 10/2018 | Yersak et al. | |
| 2018/0309166 A1 | 10/2018 | Yersak et al. | |
| 2018/0358659 A1* | 12/2018 | Subbaraman | H01M 10/0525 |
| 2018/0375148 A1 | 12/2018 | Yersak et al. | |
| 2020/0127293 A1* | 4/2020 | Son | H01M 4/628 |
| 2020/0235386 A1* | 7/2020 | Koh | H01M 4/628 |

* cited by examiner

PROTECTIVE COATINGS FOR LITHIUM METAL ELECTRODES

GOVERNMENT SUPPORT

This invention was made with government support under DE-0007787 awarded by the Department of Energy. The Government has certain rights in the invention.

INTRODUCTION

This section provides background information related to the present disclosure which is not necessarily prior art.

The present disclosure relates to protective coatings for lithium metal electrodes. More specifically, the protective coating is a double-layer comprising an organic layer disposed on a lithium metal electrode material and an inorganic layer disposed on the organic layer. The present disclosure also relates to methods of making the protective coating.

By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion and lithium-sulfur batteries include a first electrode, a second electrode, an electrolyte material, and a separator. One electrode serves as a positive electrode or cathode (on discharge) and another serves as a negative electrode or anode (on discharge). A stack of battery cells may be electrically connected to increase overall output. Conventional rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. Common negative electrode materials include lithium insertion materials or alloy host materials, like carbon-based materials, such as lithium-graphite intercalation compounds, or lithium-silicon compounds, lithium-tin alloys, and lithium titanate (LTO) (e.g., $Li_{4+x}Ti_5O_{12}$, where $0 \leq x \leq 3$, such as $Li_4Ti_5O_{12}$). The negative electrode may also be made of metallic lithium (often referred to as a lithium metal anode (LMA)), so that the electrochemical cell is considered a lithium metal battery or cell. Use of metallic lithium in the negative electrode of a rechargeable battery has various potential advantages, including having the highest theoretical capacity and lowest electrochemical potential. Thus, batteries incorporating lithium metal anodes can have a higher energy density potentially doubling storage capacity and halving the size of the battery, while maintaining a similar cycle life as other lithium ion batteries. Lithium metal batteries are thus one of the most promising candidates for high energy storage systems.

However, lithium metal batteries also have potential downsides in some instances. For example, lithium may have a comparatively high level of reactivity that can promote unfavorable dendrite formation. Further, anodes comprising lithium metal may experience volumetric expansion and contraction during successive charging and discharging cycles. Such volumetric changes may lead to fatigue cracking and decrepitation of the electroactive material. Accordingly, it would be desirable to develop materials and methods that successfully use lithium metal as an electroactive material in commercial lithium-ion batteries, especially for transportation application. In particular, it would be desirable that such materials minimize undesirable side reactions while also accommodating volumetric expansion and contraction of the lithium metal.

SUMMARY

This section provides a general summary of the disclosure, and is not a comprehensive disclosure of its full scope or all of its features.

In various aspects, the present disclosures provides a negative electrode assembly for an electrochemical cell that cycles lithium. Prior to incorporation into the electrochemical cell, the negative electrode assembly includes an electroactive material layer and a protective dual-layered coating. The electroactive material layer may include lithium metal and the protective dual-layered coating may include a polymeric layer and an inorganic layer. The polymeric layer may be ionically conductive. The polymeric layer is disposed on at least one region of a surface of the electroactive material layer and the inorganic layer may be disposed on the polymeric layer. The polymeric layer may have an elastic modulus of greater than or equal to about 0.01 GPa to less than or equal to about 410 GPa and the inorganic layer may have an elastic modulus of greater than or equal to about 10 GPa to less than or equal to about 1000 GPa.

In one aspect, the polymeric layer may include one or more organic materials having an ionic conductivity of greater than or equal to about $10^{-7}$ mS/cm to less than or equal to about 100 mS/cm.

In one aspect, the polymeric layer may include one or more organic materials selected from the group consisting of: perfluoro(2-(2-sulfonylethyoxy)propyl vinyl ether)-tetrafluoroethylene copolymer, polyacrylic acid (PAA), poly(methyl methacrylate) (PMMA), sulfonated tetrafluoroethylene based fluoropolymer-copolymer (Nafion®), and combinations thereof.

In one aspect, the polymeric layer may have a thickness of greater than or equal to about 20 nm to less than or equal to about 2 μm.

In one aspect, the polymeric layer may include one or more organic materials having an ionic conductivity of greater than or equal to about $10^{-15}$ mS/cm to less than or equal to about $10^{-7}$ mS/cm.

In one aspect, the polymeric layer may include one or more organic materials selected from the group consisting of: perfluoro(2-(2-sulfonylethyoxy)propyl vinyl ether)-tetrafluoroethylene copolymer, polyimide (PI), poly(methyl methacrylate) (PMMA), and combinations thereof.

In one aspect, the polymeric layer may have a thickness of greater than or equal to about 2 nm to less than or equal to about 500 nm.

In one aspect, the inorganic layer may include one or more inorganic materials selected from the group consisting of: lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof and may have a thickness of greater than or equal to about 1 nm to less than or equal to about 5 μm.

In one aspect, the protective dual-layered coating consists essentially of the polymeric layer and the inorganic layer. The polymeric layer may include perfluoro(2-(2-sulfonylethyoxy)propyl vinyl ether)-tetrafluoroethylene copolymer, polyacrylic acid (PAA), polyimide (PI), poly(methyl methacrylate) (PMMA), sulfonated tetrafluoroethylene based fluoropolymer-copolymer, and combinations thereof and the inorganic layer may include lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof.

In various other aspects, the present disclosure provides an electrochemical cell that cycles lithium ions. The electrochemical cell includes a negative electrode, a positive electrode, a separator, and an electrolyte. The negative electrode may include an electroactive material layer and a protective dual-layered. The electroactive material layer defines a first exposed surface and the protective dual-layered coating may be disposed over greater than or equal to about 90% of the first exposed surface of the electroactive material layer. The electroactive material layer may include lithium metal and the protective dual-layered coating may include a polymeric layer and an inorganic layer disposed on the polymeric layer.

In one aspect, the polymeric layer may include one or more organic materials selected from the group consisting of: perfluoro(2-(2-sulfonylethyoxy)propyl vinyl ether)-tetrafluoroethylene copolymer, polyacrylic acid (PAA), poly(methyl methacrylate) (PMMA), sulfonated tetrafluoroethylene based fluoropolymer-copolymer (Nafion®), and combinations thereof, The polymeric layer may have an ionic conductivity of greater than or equal to about $10^{-7}$ mS/cm to less than or equal to about 100 mS/cm and a thickness of greater than or equal to about 20 nm to less than or equal to about 2 μm.

In one aspect, the polymeric layer may include one or more organic materials selected from the group consisting of: perfluoro(2-(2-sulfonylethyoxy)propyl vinyl ether)-tetrafluoroethylene copolymer, polyimide (PI), poly(methyl methacrylate) (PMMA), and combinations thereof. The polymeric layer may have an ionic conductivity of greater than or equal to about $10^{-15}$ mS/cm to less than or equal to about $10^{-7}$ mS/cm and a thickness of greater than or equal to about 2 nm to less than or equal to about 500 nm.

In one aspect, the polymeric layer may have an elastic modulus of greater than or equal to about 0.01 GPa to less than or equal to about 410 GPa and inorganic layer may have an elastic modulus of greater than or equal to about 10 GPa to less than or equal to about 1000 GPa. The inorganic layer may include one or more inorganic materials selected from the group consisting of: lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof.

In one aspect, the electrolyte may be a solid-state electrolyte and the inorganic layer may have a thickness that is greater than or equal to about 1 nm and less than or equal to about 5 μm.

In one aspect, the inorganic layer may include one or more inorganic materials selected from the group consisting of: zirconium dioxide ($ZrO_2$), lithium oxide ($Li_2O$), Aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof. The inorganic layer may have an the ionic conductivity of greater than or equal to about $10^{-15}$ mS/cm and a thickness of greater than or equal to about 5 nm to less than or equal to about 500 nm.

In one aspect, the protective dual-layered coating consists essentially of the polymeric layer and the inorganic layer. The polymeric layer may include perfluoro(2-(2-sulfonylethyoxy)propyl vinyl ether)-tetrafluoroethylene copolymer, polyacrylic acid (PAA), polyimide (PI), poly(methyl methacrylate) (PMMA), sulfonated tetrafluoroethylene based fluoropolymer-copolymer, and combinations thereof and the inorganic layer may include lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof.

In yet other aspects, the present disclosure provides a method for making a negative electrode for an electrochemical cell. The method may include applying a polymeric layer via a first deposition process to an exposed surface of an electroactive material layer that includes lithium metal; and applying an inorganic layer via a second deposition process over the polymeric layer to form a protective dual-layer coating on the first exposed surface area of the electroactive material layer.

In one aspect, the first and second deposition processes may be independently selected from the group consisting of: a physical vapor deposition method, a chemical vapor deposition method, a non-aqueous wet-chemistry method, and combinations thereof. The physical and chemical vapor deposition methods may occur in an enclosed argon-filled environment at a temperature less than or equal to about 200° C.

In one aspect, the polymeric layer may include one or more organic materials selected from the group consisting of: perfluoro(2-(2-sulfonylethyoxy)propyl vinyl ether)-tetrafluoroethylene copolymer, polyacrylic acid (PAA), polyimide (PI), poly(methyl methacrylate) (PMMA), sulfonated tetrafluoroethylene based fluoropolymer-copolymer (Nafion®), and combinations thereof, and the inorganic layer may include one or more inorganic materials selected from the group consisting of: lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof.

In one aspect, the polymeric layer has an elastic modulus of greater than or equal to about 0.01 GPa to less than or equal to about 410 GPa and a thickness of greater than or equal to about 100 nm to less than or equal to about 2 μm. The inorganic layer may have an elastic modulus of greater than or equal to about 10 GPa to less than or equal to about 1000 GPa and a thickness of greater than or equal to about 1 nm to less than or equal to about 5 μm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
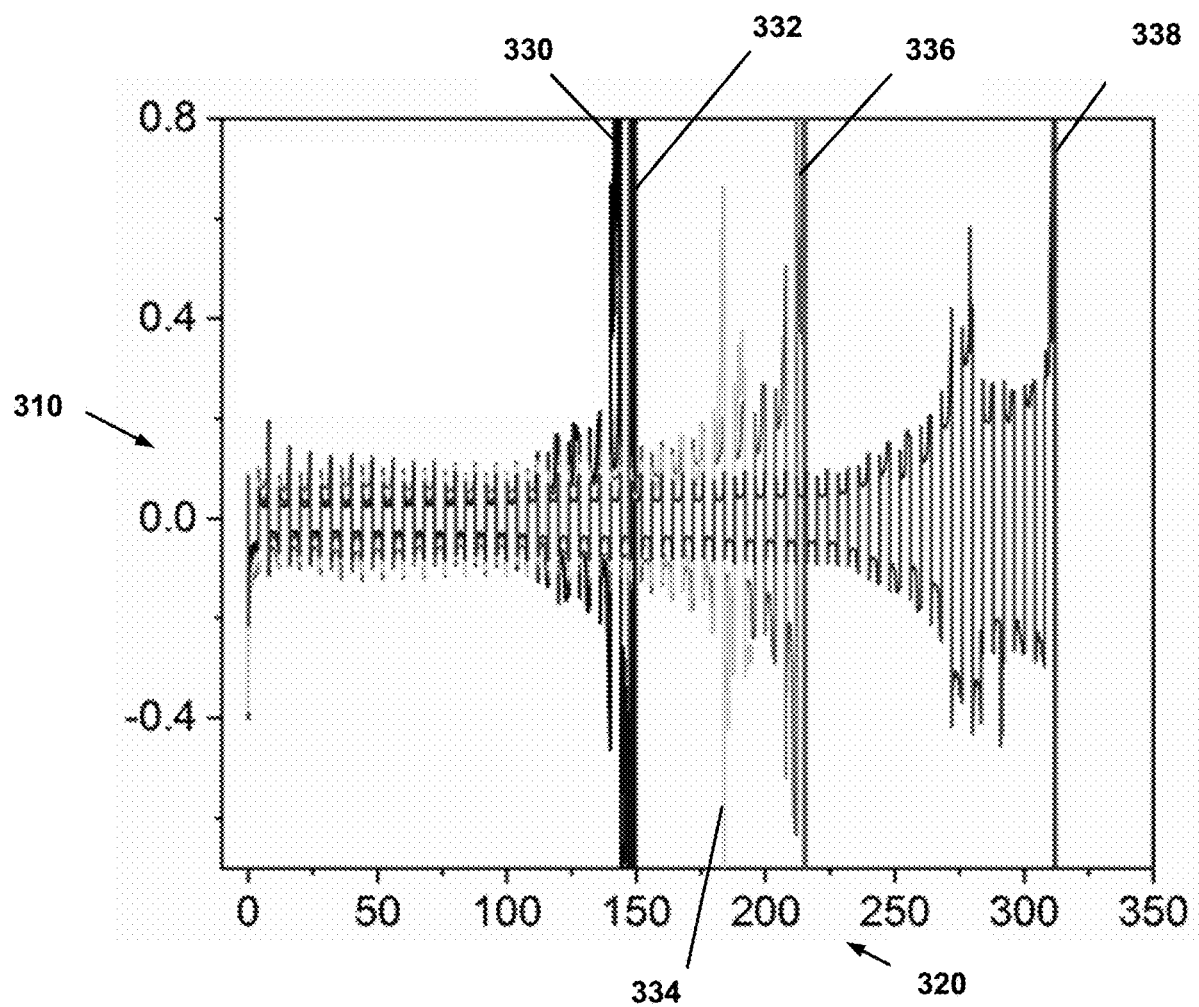
Figure 4:
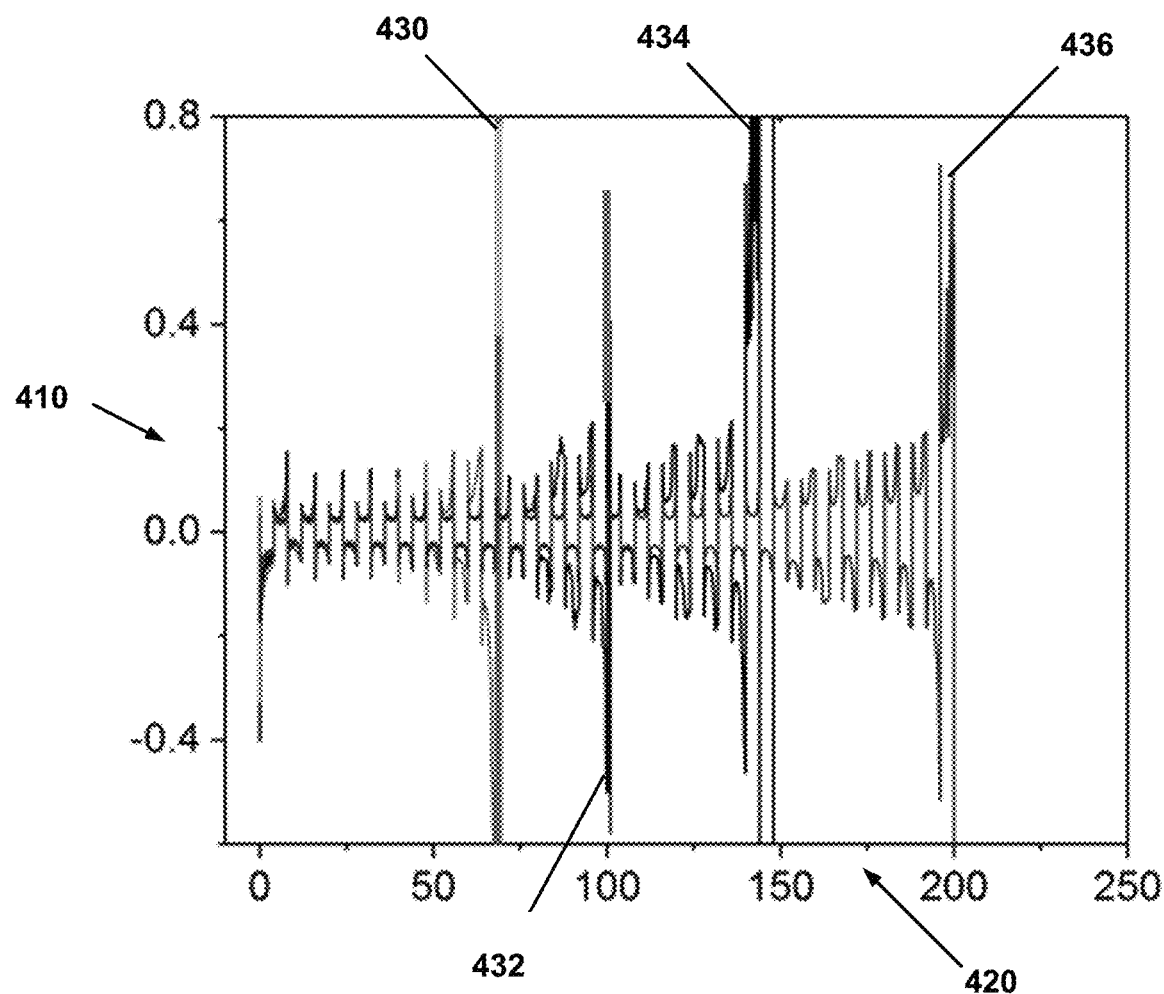

FIG. 3 is a graphical illustration of voltages of example electrochemical cells having negative electrode assemblies prepared in accordance with certain aspects of the present disclosure over time; and FIG. 4 is a graphical illustration of voltages of other example electrochemical cells having negative electrode assemblies prepared in accordance with certain aspects of the present disclosure over time.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, especially lithium-ion batteries. In various instances, such cells are used in automotive transportation application. However, the present technology may be employed in a wide variety of other applications.

As noted above, batteries incorporating lithium metal anodes can have a higher energy density potentially doubling storage capacity and halving the size of the battery, while maintaining a similar cycle life as other lithium ion batteries. As such, lithium metal batteries are one of the most promising candidates for high energy storage systems. However, lithium metal batteries also have potential downsides in some instances. For example, the lithium metal may have a comparatively high level of reactivity that can result in interfacial instability and undesired side reactions. For example, side reactions may occur between the lithium metal and various species the lithium metal may be exposed to during manufacture and/or operation of the electrochemical cell that includes the lithium metal anode. Such side reactions may promote unfavorable dendrite formation. Further, anodes comprising lithium metal may experience volumetric expansion and contraction during successive charging and discharging cycles. Such volumetric changes may lead to fatigue cracking and decrepitation of the electroactive material, which in turn may cause a loss of electrical contact between the lithium metal electroactive material and the rest of the battery cell resulting in poor capacity retention and premature cell failure.

Accordingly, it would be desirable to develop materials and methods that successfully use lithium metal as an electroactive material in commercial lithium-ion batteries, especially for transportation application. In particular, it would be desirable that such materials minimize undesirable side reactions while also accommodating volumetric expansion and contraction of the lithium metal. More particularly, the present disclosure contemplates a negative electrode for an electrochemical cell that cycles lithium, which prior to incorporation into the electrochemical cell, comprises an electroactive material layer comprising lithium metal and a protective dual-layered coating. The protective dual-layered coating includes a polymeric layer disposed on a surface of the electroactive material layer and an inorganic layer disposed on an exposed surface of the polymeric layer.

Figure 1:
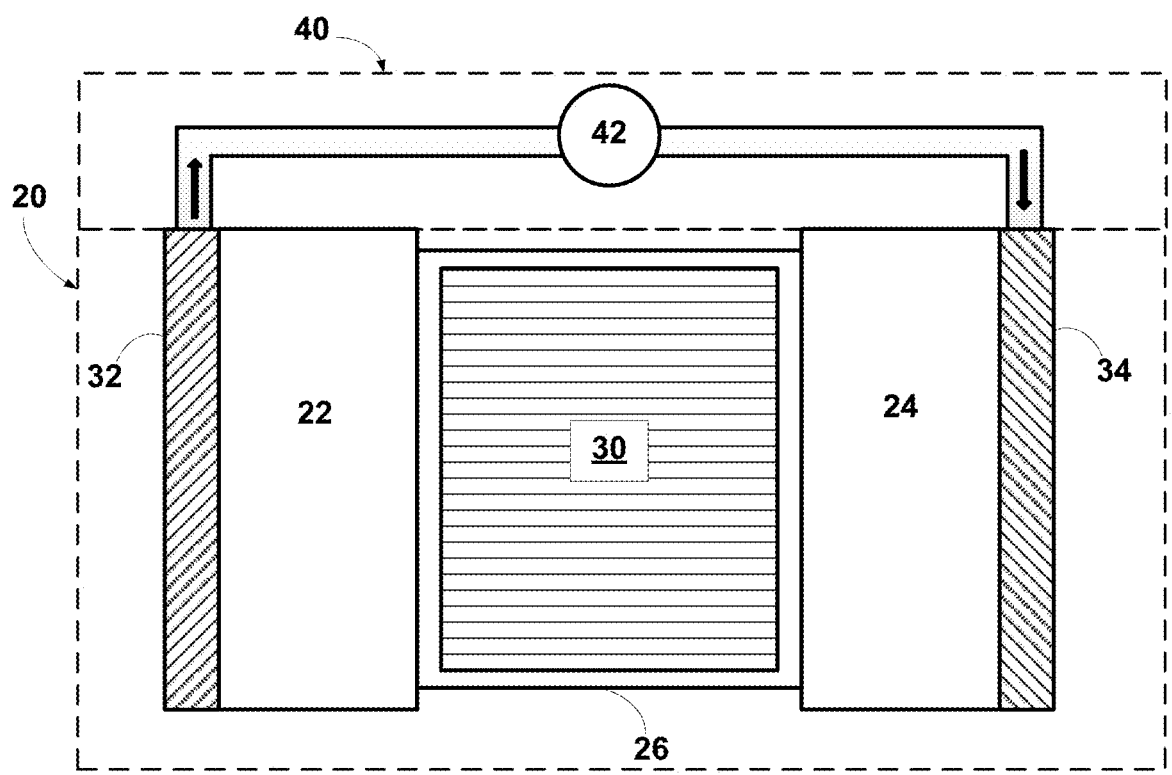
FIG. 1 is a schematic of an example electrochemical battery cell.

An exemplary and schematic illustration of an electrochemical cell (also referred to as the battery) that cycles lithium ions is shown in FIG. 1. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution 30 contained in the separator 26 towards the positive electrode 24. The electrons flow through the external circuit 40 and the lithium ions migrate across the separator 26 containing the electrolyte solution 30 to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. The connection of an external electrical energy source to the battery 20 compels the otherwise non-spontaneous oxidation of intercalated lithium at the negative electrode 22 to produce electrons and lithium ions. The electrons, which flow back towards the positive electrode 24 through the external circuit 40, and the lithium ions, which are carried by the electrolyte solution 30 across the separator 26 back towards the positive electrode 24, reunite at the positive electrode 24 and replenish it with intercalated lithium for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. Further, the separator 26 operates as an electrical insulator by being sandwiched between the negative electrode 22 and the positive electrode 24 to prevent physical contact and thus, the occurrence of a short circuit. The separator 26, in addition to providing a physical barrier between the two electrodes 22, 24, acts like a sponge that contains the electrolyte solution in a network of open pores during the cycling of lithium ions, to facilitate functioning of the battery 20.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24 may be formed from a lithium-based active material that can sufficiently undergo lithium intercalation and deintercalation, or alloying and dealloying, while functioning as the positive terminal of the battery 20. One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$), lithium manganese nickel oxide ($LiMn_{(2-x)}Ni_xO_4$, where $0 \leq x \leq 0.5$) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O_2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$), lithium manganese-iron phosphate ($LiMn_{2-x}Fe_xPO_4$, where $0<x<0.3$), or lithium iron fluorophosphates ($Li_2FePO_4F$).

In certain variations, the positive active materials may be intermingled with an electronically conducting material that provides an electron conduction path and/or at least one polymeric binder material that improves the structural integrity of the electrode. For example, the active materials and electronically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate. Electronically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used. The positive electrode current collector 34 may be formed from aluminum (Al) or any other appropriate electrically conductive material known to those of skill in the art.

In various aspects, the porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), titania ($TiO_2$), or combinations thereof. Various conventionally available polymers and commercial products for forming the separator 26 are contemplated, as well as the many manufacturing methods that may be employed to produce such a microporous polymer separator 26.

In various aspects, the negative electrode 22 includes an electroactive material that may be a lithium host material capable of functioning as a negative terminal of a lithium-ion battery. In various aspects, the electroactive material comprises lithium and may be a film or layer formed of lithium metal or an alloy of lithium. For example, in certain variations, the negative electrode 22 may be a layer formed of lithium metal or an alloy of lithium having greater than or equal to about 98 to 99% by weight of lithium metal or the lithium alloy.

In certain variations, the negative electrode 22 may optionally include an electrically conductive material, as well as one or more polymeric binder materials to structurally hold the lithium material together. For example, the negative electrode 22 may include about 50-100% of an electroactive material, and optionally, less than or equal to about 30% of an electrically conductive material, and a balance of binder. The negative electrode 22 may include an active material including lithium metal particles intermingled with a binder material selected from the group consisting of: polyvinylidene difluoride (PVdF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, and combinations thereof. Suitable additional electrically conductive materials may include carbon-based material or a conductive polymer. Carbon-based materials may include by way of example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used.

As noted, in various aspects, the positive electrode 24, the negative electrode 22, and the separator 26 may each include an electrolyte solution or system 30 inside their pores, capable of conducting lithium ions between the negative electrode 22 and the positive electrode 24. In certain aspects, the electrolyte 30 may be a non-aqueous liquid electrolyte solution that includes one or more lithium salts dissolved in an organic solvent or a mixture of organic solvents. Numerous aprotic non-aqueous liquid electrolyte solutions may be employed in the lithium-ion battery 20.

For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate (LiB(C6H5)4), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof.

These and other similar lithium salts may be dissolved in a variety of aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

In various other aspects, the electrolyte system for the lithium metal battery may be one of an all-solid system and a solid-liquid system. The all-solid system includes a solid-state electrolyte (SSE) disposed between a positive electrode and a negative electrode that includes lithium metal. In such instances, the solid-state electrolyte serves as both an electrolyte and a separator, enabling transfer of lithium ions, while mechanically separating and providing electrical insulation between the electrodes of different polarities. The solid-state electrolyte can be formed from either a ceramic material (e.g., an oxide-based ceramic or a sulfide or oxysulfide glass or glass-ceramic) or a polymeric material.

A solid-liquid system includes an electrolyte system disposed between a positive electrode and a negative electrode. An electrochemical cell incorporating a solid-liquid electrolyte system may be referred to as a "hybrid battery." The electrolyte system typically includes a liquid electrolyte component and a polymeric component (e.g., a "polymer protection layer"). The liquid electrolyte component and the polymeric component may be distinct layers, or they may alternatively be blended. When the components are present as distinct layers, the liquid electrolyte may be disposed adjacent to and between the positive electrode and the polymeric component, which may include one or more layers. The polymeric component may be disposed between the liquid electrolyte and the negative electrode. When the components are blended, the resultant electrolyte system may have a blended gel or composite structure.

Figure 2:
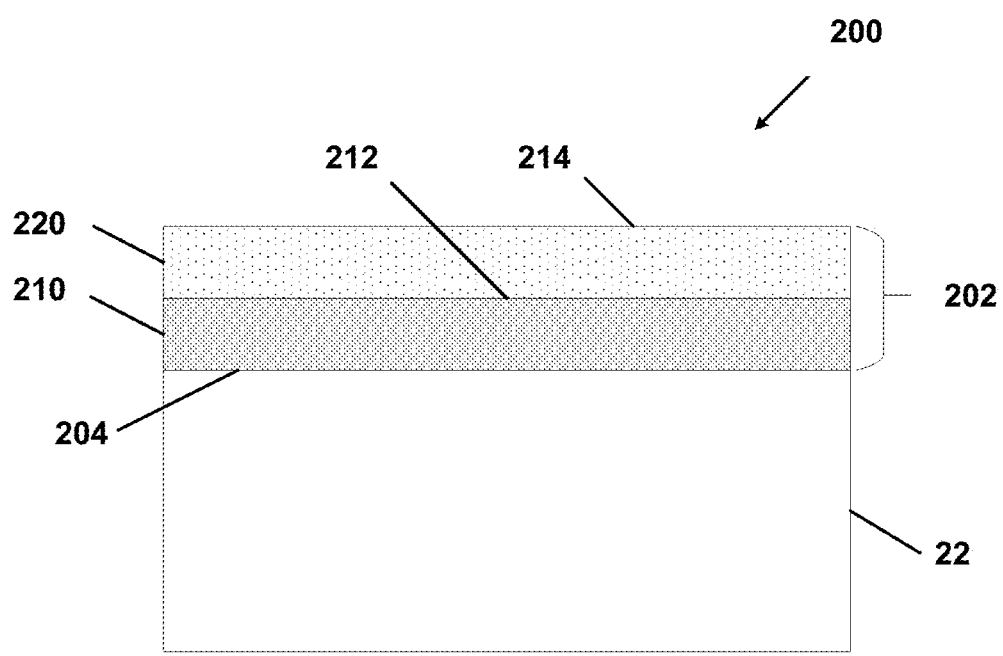
FIG. 2 is a schematic of an example of a negative electrode assembly prepared in accordance with certain aspects of the present disclosure comprising a lithium metal-containing electroactive layer and a dual-layered protective coating disposed thereon.

As illustrated in FIG. 2, in various aspects, an artificial solid electrolyte interphase (SEI) or protective coating 202 may be disposed on one or more exposed surfaces of the electroactive material layer or negative electrode 22, for example, on the surface 204 of the negative electrode 22 facing the positive electrode 24, to form a negative electrode assembly 200. As such, the protective coating 202 may be disposed on and directly in contact with the electroactive material film or layer 22, where the electroactive material layer 22 comprises lithium metal or an alloy of lithium. For example, the protective coating 202 may be disposed on and directly in contact with at least one region of a surface of the electroactive material layer 22.

The protective coating 202 may be a dual-layered protective coating that comprises a first layer 210 disposed on the first surface 204 of the negative electrode 22 and a second layer 220 disposed on an exposed surface 212 of the first layer 210. The exposed surface 212 of the first layer 210 opposes the first surface 204 of the negative electrode 22. In various aspects, the first layer 210 is an organic, polymeric layer having a first elastic modulus of greater than or equal to about 0.01 GPa to less than or equal to about 4 GPa and the second layer 220 is an inorganic layer having a second elastic modulus of greater than or equal to about 4 GPa to less than or equal to about 1100 GPa.

The first layer 210 comprises one or more polymers that are compatible with and that may be in direct contact with the lithium metal-containing electroactive material. For example, the first layer 210 may comprise one or more organic materials selected from the group consisting of: perfluoro(2-(2-sulfonylethyoxy)propyl vinyl ether)-tetrafluoroethylene copolymer, polyacrylic acid (PAA), polyimide (PI), poly(methyl methacrylate) (PMMA), sulfonated tetrafluoroethylene based fluoropolymer-copolymer (Nafion®), and combinations thereof.

In certain instances, the first layer 210 may comprise one or more organic materials having the capability for ion exchange. In such instances, the first layer 210 has a large or higher ionic conductivity. For example, the first layer 210 may have an ionic conductivity of greater than or equal to about $10^{-7}$ mS/cm to less than or equal to about 100 mS/cm. In such instances, the first layer 210 may comprise one or more organic materials selected from the group consisting of: perfluoro(2-(2-sulfonylethyoxy)propyl vinyl ether)-tetrafluoroethylene copolymer, polyacrylic acid (PAA), poly (methyl methacrylate) (PMMA), sulfonated tetrafluoroethylene based fluoropolymer-copolymer (Nafion®), and combinations thereof. In such instances, the first layer 210 also has a thickness of greater than or equal to about 20 nm to less than or equal to about 2 µm.

In certain other instances, the first layer 210 may comprise one or more organic materials that have a relatively diminished ion conductivity and exchange level. In such instances, the first layer 210 has a smaller or lower ionic conductivity. For example, the first layer 210 may have an ionic conductivity of greater than or equal to about $10^{-15}$ mS/cm to less than or equal to about $10^{-7}$ mS/cm, and in certain aspects, optionally greater than or equal to about $10^{-10}$ mS/cm to less than or equal to about $10^{-7}$ mS/cm. In such instances, the first layer may comprise one or more organic materials selected from the group consisting of: perfluoro(2-(2-sulfonylethyoxy)propyl vinyl ether)-tetrafluoroethylene copolymer, polyimide (PI), poly(methyl methacrylate) (PMMA), and combinations thereof. In such instances, the first layer 210 also has a thickness of greater than or equal to about 2 nm to less than or equal to 500 nm.

As such, a first layer 210 comprising one or more organic materials having a first level of ionic conductivity (for example, an ionic conductivity of greater than or equal to about $10^{-7}$ mS/cm to less than or equal to about 100 mS/cm) has a larger thickness than a first layer 210 comprising one or more organic materials having a second level of ionic conductivity that is relatively lower than the first level (for example, an ionic conductivity of greater than or equal to about $10^{-15}$ mS/cm to less than or equal to about $10^{-7}$ mS/cm).

In one variation, the first layer 210 may consist essentially of one or more polymeric materials selected from the group consisting of: perfluoro(2-(2-sulfonylethyoxy)propyl vinyl ether)-tetrafluoroethylene copolymer, polyacrylic acid (PAA), poly(methyl methacrylate) (PMMA), sulfonated tetrafluoroethylene based fluoropolymer-copolymer (Nafion®), and combinations thereof and having an ionic conductivity of greater than or equal to about $10^{-7}$ mS/cm to less than or equal to about 100 mS/cm.

In one variation, the first layer 210 may consist essentially of one or more polymeric materials selected from the group consisting of: perfluoro(2-(2-sulfonylethyoxy)propyl vinyl ether)-tetrafluoroethylene copolymer, polyimide (PI), poly(methyl methacrylate) (PMMA), and combinations thereof and having an ionic conductivity of greater than or equal to about $10^{-15}$ mS/cm to less than or equal to about $10^{-7}$ mS/cm.

In still other instances, the first layer 210 may be a dual layer (not shown) comprising a first sublayer having an ionic conductivity of greater than or equal to about $10^{-7}$ mS/cm to less than or equal to about 100 mS/cm and a second sublayer having an ionic conductivity of greater than or equal to about $10^{-15}$ mS/cm to less than or equal to about $10^{-7}$ mS/cm. In such instances, the first sublayer having the higher ionic conductivity is disposed adjacent the surface 204 of the negative electrode 22.

The second layer 220 comprises one or more inorganic materials selected from the group consisting of: lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof. The inorganic layer 220 may have a thickness of greater than or equal to about 1 nm to less than or equal to about 5 µm, and in certain aspects, optionally from greater than or equal to about 5 nm to less than or equal to about 500 nm. In certain instances, the inorganic layer 220 may having an ionic conductivity of greater than or equal to about $10^{-10}$ mS/cm.

For example, in certain variations, the protective dual-layered 202 coating consists essentially of the polymeric layer 210 and the inorganic layer 220, where the polymeric layer 210 comprises perfluoro(2-(2-sulfonylethyoxy)propyl vinyl ether)-tetrafluoroethylene copolymer, polyacrylic acid (PAA), polyimide (PI), poly(methyl methacrylate) (PMMA), sulfonated tetrafluoroethylene based fluoropolymer-copolymer, and combinations thereof and the inorganic layer 220 comprises lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof.

In various aspects, forming the negative electrode assembly 200 includes forming the protective coating 202 by applying the first layer 210 to the exposed surface 204 of the negative electrode 22 and applying the second layer 220 to on the exposed surface 212 of the first layer 210. In this fashion, the first and second layers 210, 220 are intentionally disposed onto the negative electrode 22 with given thicknesses. For example, the first and second layers 210, 220 may not be self-forming.

The first layer 210 may be applied on the exposed surface 204 of the negative electrode 22 using a first deposition process and the second layer 220 may be applied on the exposed surface 212 of the first layer 210 using a second deposition process. The first and second deposition processes are independently selected from the group consisting of a physical vapor deposition method, a chemical vapor deposition method, a non-aqueous wet-chemistry method, and combinations thereof. The physical and chemical vapor deposition methods occur in enclosed argon-filled environments at temperatures less than or equal to about 200° C. In certain instances, depending on the thickness and electroconductivity of the first and second layers 210, 220—for example, if the first and second layers 210, 220 do not prevent the electron from reaching the liquid electrolyte—a third layer (not shown) may passively form (e.g. self-formed layer) on a surface 214 of the second layer 220 that opposes the second surface 212 of the first layer 210. The third layer comprises the organic polymeric materials that also form the first layer 210.

The dual-layered protective coating enables good mechanical protection of the lithium metal-containing electroactive material and strong interfacial adhesion between the electroactive material layer and the inorganic layer. The organic polymeric layer can serve as a buffer layer that accommodates volumetric changes of the electroactive layer, while the inorganic layer can suppress electrolyte decomposition and dendrite growth. For example, FIGS. 3 and 4 inspect comparable electrochemical cells by plotting voltages (V) from the comparable electrochemical cells as a function of time (h).

More specifically, FIG. 3 compares five electrochemical cells 330, 332, 334, 336, and 338. The x-axis 320 depicts time in hours and the y-axis 310 depicts voltage. Electrochemical cell 330 comprises a negative electrode including a lithium metal electroactive layer. Electrochemical cell 332 comprises a negative electrode including a lithium metal electroactive film or layer and an organic layer comprising polyacrylic acid (PAA) disposed on a first surface of the film of lithium that opposes a positive electrode. The organic layer of electrochemical cell 332 has a thickness of greater than or equal to about 10 nm to less than or equal to about 1 µm. Electrochemical cell 334 comprises a negative electrode including a lithium metal electroactive film or layer and an inorganic layer comprising zirconium dioxide ($ZrO_2$) and having a thickness of about 50 nm (500 ALD cycles) disposed on a first surface of the film of lithium that opposes a positive electrode. Electrochemical cell 336 comprises a negative electrode including a lithium metal electroactive film or layer, an inorganic layer comprising zirconium dioxide ($ZrO_2$) and having a thickness of about 500 nm disposed on a first surface of the film of lithium that opposes a positive electrode, and an organic layer comprising polyacrylic acid (PAA) disposed on an exposed surface of the inorganic layer that opposes the positive electrode. Electrochemical cell 338 comprises a negative electrode including a lithium metal electroactive film or layer, an organic layer comprising polyacrylic acid (PAA) disposed on a first surface of the film of lithium that opposes a positive electrode, and an inorganic layer comprising zirconium dioxide ($ZrO_2$) and having a thickness of about 500 nm disposed on an exposed surface of the organic layer that opposes the positive electrode.

As shown in FIG. 3, electrochemical cell 338 including the lithium metal electroactive layer and inorganic layer and organic layer disposed therebetween prepared in accordance with certain aspects of the present disclosure has improved long-term performance compared to electrochemical cells 330, 332, 334, and 336. More particularly, electrochemical cell 338 has an improved long-term performance of about 20%, and optionally about 30%, compared to electrochemical cell 336. Electrochemical cell 338 has an improved long-term performance of by about 40%, and optionally about 50%, compared to electrochemical cell 334. Electrochemical cell 338 has an improved long-term performance of about 80%, and optionally about 90%, compared to electrochemical cells 330 and 332.

In this fashion, electrochemical cell 338, which is prepared in accordance with certain aspects of the present disclosure, has an improved long-term performance of about 20%, and optionally about 30%, compared to electrochemical cell 336 having a inorganic layer disposed on the negative electrode and an organic layer subsequently formed on the inorganic layer; an improved performance of about 40%, and optionally about 50%, compared to electrochemical cell 334 having only an inorganic layer disposed on the lithium film; an improved performance of about 80%, and optionally about 90%, compared to electrochemical cell 332 having only an organic layer disposed on the lithium film; and an improved performance of about 80%, and optionally about 90%, compared to electrochemical cell 330 comprising only the lithium film.

FIG. 4 compares four electrochemical cells 430, 432, 434, and 436. The x-axis 420 depicts time in hours and the y-axis 410 depicts voltage. Electrochemical cell 430 comprises a negative electrode including a lithium metal electroactive film or layer having a thickness of about 250 μm and an organic layer comprising polyimide (PI) disposed on a first surface of the lithium film that opposes a positive electrode. The organic layer of electrochemical cell 430 has a thickness of about 100 nm. Electrochemical cell 432 comprises a negative electrode including a lithium metal electroactive film layer having a thickness of about 50 nm and an inorganic layer comprising zirconium dioxide ($ZrO_2$) disposed on a first surface of the lithium film that opposes a positive electrode. Electrochemical cell 434 comprises a negative electrode including a lithium metal electroactive film or layer having a thickness of about 250 μm. Electrochemical cell 436 comprises a negative electrode including a lithium metal electroactive film or layer having a thickness of about 250 nm, an organic layer comprising polyimide (PI) and having a thickness of about 100 nm disposed on a first surface of the lithium film that opposes a positive electrode, and an inorganic layer comprising zirconium dioxide ($ZrO_2$) disposed on an exposed surface of the organic layer having a thickness of about 50 nm that opposes the positive electrode.

As shown in FIG. 4, electrochemical cell 436 including the lithium metal electroactive layer and inorganic layer and organic layer disposed therebetween prepared in accordance with certain aspects of the present disclosure has improved long-term performance compared to electrochemical cells 430, 432, and 434. More particularly, electrochemical cell 436 has an improved long-term performance of about 30%, and optionally about 40%, compared to electrochemical cell 434. Electrochemical cell 430 has a decreased long-term performance of about 40%, and in certain instances of about 50%, compared to electrochemical cell 434. Electrochemical cell 432 has a decreased long-term performance of about 20%, and in certain instances about 30% compared to electrochemical cell 434.

In this fashion, electrochemical cell 436, which is prepared in accordance with certain aspects of the present disclosure, has an improved long-term performance of about 30%, and optionally about 40%, compared to electrochemical cell 434 comprising only a lithium film; an improved long-term performance of about 50%, and optionally about 70% compared to electrochemical cell 432 having only an inorganic layer; an improved long-term performance of about 70%, and optionally about 90%, compared to electrochemical cell 430 having only an organic layer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A negative electrode assembly for an electrochemical cell that cycles lithium, wherein prior to incorporation into the electrochemical cell the negative electrode assembly comprising:
    an electroactive material layer comprising lithium metal; and
    a protective dual-layered coating that is ionically conductive, the coating comprising:
    a polymeric layer disposed on at least one region of a surface of the electroactive material layer, the polymeric layer having an overall elastic modulus of greater than or equal to about 0.01 GPa to less than or equal to about 410 GPa and a thickness of greater than or equal to about 2 nm to less than or equal to about 500 nm, the polymeric layer comprising a first sublayer having a first ionic conductivity greater than or equal to about $10^{-7}$ mS/cm to less than or equal to about 100 mS/cm and a second sublayer having a second ionic conductivity greater than or equal to about $10^{-15}$ mS/cm to less than or equal to about $10^{-7}$ mS/cm, the first sublayer being disposed adjacent to the electroactive material layer, the first sublayer comprising one or more organic materials selected from the group consisting of: perfluoro(2-(2-sulfonylethyoxy)propyl vinyl ether)-tetrafluoroethylene copolymer, polyacrylic acid (PAA), and combinations thereof, and the second sublayer comprising one or more organic materials selected from the group consisting of: perfluoro(2-(2-sulfonylethyoxy)propyl vinyl ether)-tetrafluoroethylene copolymer, polyimide (PI), and combinations thereof; and
    an inorganic layer disposed on the polymeric layer, the inorganic layer having an elastic modulus of greater than or equal to about 10 GPa to less than or equal to about 1000 GPa and a thickness greater than or equal to about 5 nm to less than or equal to about 500 nm.

2. The negative electrode assembly of claim 1, wherein the second sublayer of the polymeric layer further comprises poly(methyl methacrylate) (PMMA).

3. The negative electrode assembly of claim 1, wherein the inorganic layer comprises one or more inorganic materials selected from the group consisting of: lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof.

4. An electrochemical cell that cycles lithium ions comprising:
a negative electrode comprising:
an electroactive material layer defining a first exposed surface and comprising lithium; and
a protective dual-layered coating disposed over greater than or equal to about 90% of the first exposed surface of the electroactive material layer, wherein the protective dual-layered coating comprises:
a polymeric layer comprising a first sublayer having a first ionic conductivity greater than or equal to about $10^{-7}$ mS/cm to less than or equal to about 100 mS/cm and a second sublayer having a second ionic conductivity greater than or equal to about $10^{-15}$ mS/cm to less than or equal to about $10^{-7}$ mS/cm, the first sublayer being disposed adjacent to the electroactive material layer, wherein the first sublayer comprises one or more organic materials selected from the group consisting of: perfluoro(2-(2-sulfonylethyoxy) propyl vinyl ether)-tetrafluoroethylene copolymer, polyacrylic acid (PAA), and combinations thereof, and the second sublayer comprises one or more organic materials selected from the group consisting of: perfluoro(2-(2-sulfonylethyoxy)propyl vinyl ether)-tetrafluoroethylene copolymer, polyimide (PI), and combinations thereof; and
an inorganic layer disposed on the polymeric layer;
a positive electrode;
a separator; and
an electrolyte.

5. The electrochemical cell of claim 4, wherein the polymeric layer has an elastic modulus of greater than or equal to about 0.01 GPa to less than or equal to about 410 GPa, and
wherein the inorganic layer comprises one or more inorganic materials selected from the group consisting of: lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof and has an elastic modulus of greater than or equal to about 10 GPa to less than or equal to about 1000 GPa.

6. The electrochemical cell of claim 4, wherein the electrolyte is a solid-state electrolyte and the inorganic layer has a thickness that is greater than or equal to about 1 nm and less than or equal to about 5 μm.

7. The electrochemical cell of claim 4, wherein the inorganic layer comprises one or more inorganic materials selected from the group consisting of: zirconium dioxide ($ZrO_2$), lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof and has an ionic conductivity of greater than or equal to about $10^{-15}$ mS/cm and a thickness of greater than or equal to about 5 nm to less than or equal to about 500 nm.

8. A method for making a negative electrode for an electrochemical cell, the method comprising:
applying a polymeric layer via a first deposition process to an exposed surface of an electroactive material layer comprising lithium metal, the polymeric layer comprising a first sublayer having a first ionic conductivity greater than or equal to about $10^{-7}$ mS/cm to less than or equal to about 100 mS/cm and a second sublayer having a second ionic conductivity greater than or equal to about $10^{-15}$ mS/cm to less than or equal to about $10^{-7}$ mS/cm, the first sublayer being disposed adjacent to the electroactive material layer, wherein the first sublayer comprises one or more organic materials selected from the group consisting of: perfluoro(2-(2-sulfonylethyoxy)propyl vinyl ether)-tetrafluoroethylene copolymer, polyacrylic acid (PAA), and combinations thereof, and the second sublayer comprises one or more organic materials selected from the group consisting of: perfluoro(2-(2-sulfonylethyoxy)propyl vinyl ether)-tetrafluoroethylene copolymer, polyimide (PI), and combinations thereof; and
applying an inorganic layer via a second deposition process over the polymeric layer to form a protective dual-layer coating on the first exposed surface area of the electroactive material layer.

9. The method of claim 8, wherein the first and second deposition processes are independently selected from the group consisting of: a physical vapor deposition method, a chemical vapor deposition method, a non-aqueous wet-chemistry method, and combinations thereof,
wherein the physical and chemical vapor deposition methods occur in an enclosed argon-filled environment at a temperature less than or equal to about 200° C.

10. The method of claim 8,
wherein the inorganic layer comprises one or more inorganic materials selected from the group consisting of: lithium oxide ($Li_2O$), aluminum oxide ($Al_2O_3$), zirconium dioxide ($ZrO_2$), lithium fluoride (LiF), lithium aluminate ($LiAlO_2$), lithium lanthanum zirconium oxide ($Li_7La_3Zr_2O_{12}$) (LLZO), lithium phosphorus oxynitride (LIPON), and combinations thereof.

11. The method of claim 8, wherein the polymeric layer has an elastic modulus of greater than or equal to about 0.01 GPa to less than or equal to about 410 GPa and a thickness of greater than or equal to about 100 nm to less than or equal to about 2 μm, and
wherein the inorganic layer has an elastic modulus of greater than or equal to about 10 GPa to less than or equal to about 1000 GPa and a thickness of greater than or equal to about 1 nm to less than or equal to about 5 μm.

* * * * *